US008831361B2

(12) United States Patent
Pintsov

(10) Patent No.: US 8,831,361 B2
(45) Date of Patent: Sep. 9, 2014

(54) METHOD AND SYSTEM FOR COMMERCIAL DOCUMENT IMAGE CLASSIFICATION

(75) Inventor: David A. Pintsov, San Diego, CA (US)

(73) Assignee: Ancora Software Inc., San Diego, CA (US)

( * ) Notice: Subject to any disclaimer, the term of this patent is extended or adjusted under 35 U.S.C. 154(b) by 235 days.

(21) Appl. No.: 13/417,037

(22) Filed: Mar. 9, 2012

(65) Prior Publication Data
US 2013/0236111 A1    Sep. 12, 2013

(51) Int. Cl.
*G06K 9/62*    (2006.01)

(52) U.S. Cl.
USPC .......................................... 382/224; 382/209

(58) Field of Classification Search
None
See application file for complete search history.

(56) References Cited

U.S. PATENT DOCUMENTS

| | | | |
|---|---|---|---|
| 5,293,429 A * | 3/1994 | Pizano et al. | 382/202 |
| 5,555,556 A | 9/1996 | Ozaki | |
| 6,243,723 B1 | 6/2001 | Ikeda et al. | |
| 6,542,635 B1 | 4/2003 | Hu et al. | |
| 6,721,463 B2 | 4/2004 | Naoi et al. | |
| 6,792,415 B2 | 9/2004 | Shih et al. | |
| 6,976,207 B1 | 12/2005 | Rujan et al. | |
| 7,185,008 B2 | 2/2007 | Kawatani | |
| 7,499,591 B2 | 3/2009 | Simske et al. | |
| 7,519,226 B2 * | 4/2009 | Kaneda et al. | 382/224 |
| 7,602,971 B2 * | 10/2009 | Yeh et al. | 382/176 |
| 8,264,502 B2 * | 9/2012 | Wang et al. | 345/619 |
| 8,285,057 B2 * | 10/2012 | Sarkar | 382/209 |
| 2004/0013302 A1 | 1/2004 | Ma et al. | |
| 2009/0154778 A1 | 6/2009 | Lei et al. | |
| 2010/0284623 A1 | 11/2010 | Chen et al. | |

OTHER PUBLICATIONS

A. M. Namboodiri and A K. Jain, Document Structure and Layout Analysis, Digital Document Processing: Major Directions and Recent Advances B. B. Chaudhuri (ed.), Springer-Verlag, London, (ISBN:978-1-84628-501-1), Jan. 2007, pp. 29-48.
Song Mao, Azriel Rosenfeld, and Tapas Kanungo, Document Structure Analysis Algorithms: A Literature Survey, Proc. SPIE Electronic Imaging, 2003.
S. Theodoridis, K. Koutrumbas, Pattern Recognition, Academic Press, 1999.
R. Burkard, M. Dell'Amico, S. Martello, Assignment Problems, SIAM, 2009.
V.I. Levenshtein, "Binary codes capable of correcting deletions, insertions, and reversals". Soviet Physics Doklady 10: pp. 707-710, 1966.
R. A. Wagner and M. J. Fisher, The string-to-string correction problem, Journal of the Association for Computing Machinery, 21(1):168-173, Jan. 1974.

* cited by examiner

*Primary Examiner* — Daniel Mariam

(57) ABSTRACT

A completely automated method for classifying electronic images of commercial documents such as invoices, bills of lading, explanations of benefits, etc. is based on the layout of the documents. A document is classified as belonging to a class of similarly laid out images if its distance, determined by a set of pre-defined metrics, to any of the template layouts from the same class of template layouts does not exceed a certain user-defined threshold. Alternatively, if the sum of distances from a given image to several template layouts from the same class does not exceed a user-selected threshold, the image is deemed to belong to a class of images with a specific layout.

12 Claims, 4 Drawing Sheets

101
ABC Inc.
999 Main Street South
Springfield, IL 62701

101
XYZ Ltd.
543 Mountain Road
San Diego, CA 92335

103
Invoice Number A2312007
Invoice Date 08.07.2011

102
Invoice

| Qty Ordered | Qty shipped | Product Code | Unit Price | Extended Price |
|---|---|---|---|---|
| 1 | 1 | 1256 | 2.43 | 2.43 |
| 2 | 2 | 3248 | 11.99 | 23.98 |

Total    26.41

101

ABC Inc,
999 Main Street South
Springfield, IL 62701

101

XYZ Ltd,
543 Mountain Road
San Diego, CA 92335

103

Invoice

Invoice Number A2312007
Invoice Date 08.07.2011

102

| Qty Ordered | Qty shipped | Product Code | Unit Price | Extended Price |
|---|---|---|---|---|
| 1 | 1 | 1256 | 2.43 | 2.43 |
| 2 | 2 | 3248 | 11.99 | 23.98 |

Total 26.41

*FIG. 1*

GeoDist (R,S) = 1 - Area (R ∩ S)/ maximum
(Area(R), Area(S))

LineDist(L, M) depends on (Pos(L) - Pos(M)) and (Length(L) - Length(M))

METHOD AND SYSTEM FOR COMMERCIAL DOCUMENT IMAGE CLASSIFICATION

FIELD OF INVENTION

The present invention describes a method and system for classifying a plurality of electronic images (e.g. in TIFF, PDF or JPG formats) of printed documents into classes of similarly laid out documents that originate from the same source such as accounting systems, enterprise resource management software, accounts receivable management software, etc.

BACKGROUND OF THE INVENTION AND RELATED ART

The number of documents that are exchanged between different businesses is increasing very rapidly. Every institution, be it a commercial company, an educational establishment or a government organization receives hundreds and thousands of documents from other organizations every day. All these documents have to be processed as fast as possible and information contained in them is vital for various functions of both receiving and sending organizations. It is, therefore, highly desirable to automate the processing of received documents.

There are many document classification systems known in the art. The references described below and the art cited in those references is incorporated in the background below.

There are at least two ways of interpreting the term "classification". One relates to classifying documents into groups having similar context. Normally it means documents having similar collections of related keywords. This is sometimes called categorization. Another way of classifying documents treats documents as similar if they have similar layouts. It is this latter classification that the present invention is concerned with.

The existing classification patents could themselves be classified into several groups. One group is concerned with classifying electronic documents (normally not images of documents, but electronically generated documents) in the natural language processing context where the features used for classification are words (keywords) that are present in documents to be classified, and their attributes such as frequency of their occurrence. To this category belong, for example U.S. Pat. No. 6,976,207 and U.S. Pat. No. 6,243,723. Another group deals with methods of using combinations of multiple different classifiers to achieve better results than a single classifier (U.S. Pat. No. 7,499,591, U.S. Pat. No. 6,792,415). Yet another group targets optimization of classification features that provide a more efficient separation of various classes of documents in the feature vector space, as exemplified by U.S. Pat. No. 7,185,008, so that it is easier to separate the documents themselves. There are also patents that classify documents in genres such as advertisements, brochures, photos, receipts, etc. (US Patent Application 2010/0284623). Yet another group of patents attempts to extract features (from document images) that can be useful in classifying various types of documents (U.S. Pat. No. 5,555,556). There are also patents that prescribe using layouts for document classification and identification. To this category belong U.S. Pat. No. 6,542,635 and US patent application US2004/0013302, U.S. Pat. No. 6,721,463 and references cited therein. US Patent Application 2009/0154778 discloses a system for identification of personal identity documents such as passports. U.S. Pat. No. 6,542,635 teaches a method of classifying documents into types such as letters, journals and magazines by first segmenting their images into blocks of text and white space and uses hidden Markov models to train classifier to distinguish between these categories. Layout is defined as a unique fixed vector scheme encoding each row of text. It does not address the problem of identifying documents having fixed layouts that originate from the same printing program or source and it does not utilize features other than text blocks. U.S. Pat. No. 6,721,463 prescribes using ruled lines and document titles for document classification and ignores other elements present in the document. US Patent application 2004/0013302 builds a layout graph model which utilizes such specific features as fonts and font sizes and leaves out geometric lines as informative features. The classification is based on comparison of layout graphs. There are known in the art document classification systems (for example U.S. Pat. No. 6,243,723) that require a human to manually set up features salient for classification namely those features that would be present in one type of documents and absent in others, such as specific logos, or specific keywords, company names, etc. All described patents are incorporated herein as references.

Unlike methods deployed in the prior art, the present invention teaches a totally automatic method of classifying documents which originate from a specific printing program (such as an invoice printing software or an explanation of benefits printing program or a bill of lading printing system). These documents typically exhibit a specific pre-programmed layout. The layout in this context means a specific geometric configuration of isolated text blocks and their interrelations, geometric lines and their interrelations and the contents of text blocks. Thus the prior art either addresses a different problem of classifying documents into more general classes or genres such as letters of journal articles, or ignores some vital information useful in classification. In contrast, the present invention overcomes difficulties of the prior art by a fully automated method and system that effectively utilizes classification-critical information.

SUMMARY OF THE INVENTION

The present invention provides a method and system for automatically classifying electronic images of documents having a specific originating mechanism into classes corresponding to their originators such as invoices printed by the same accounting software or explanations of benefits generated by the same enterprise content management system. The method relies on utilization of permanent layout features while variable content of the documents is ignored.

One embodiment of the present invention consists of several methods: a method that classifies document images based on the text blocks located in the images, a method that classifies the images based on all the horizontal and vertical geometric line segments found in them, a method that combines the classification results from the text blocks and the line segments methods, and a method that utilizes the contents of the matching text blocks to achieve the final classification.

BRIEF DESCRIPTION OF THE DRAWINGS

FIG. 1 is an illustrative representation of a typical class of documents that are subject of the present invention showing text blocks, geometric lines and contents of text blocks.

DETAILED DESCRIPTION OF THE PREFERRED EMBODIMENT

Figure 2:
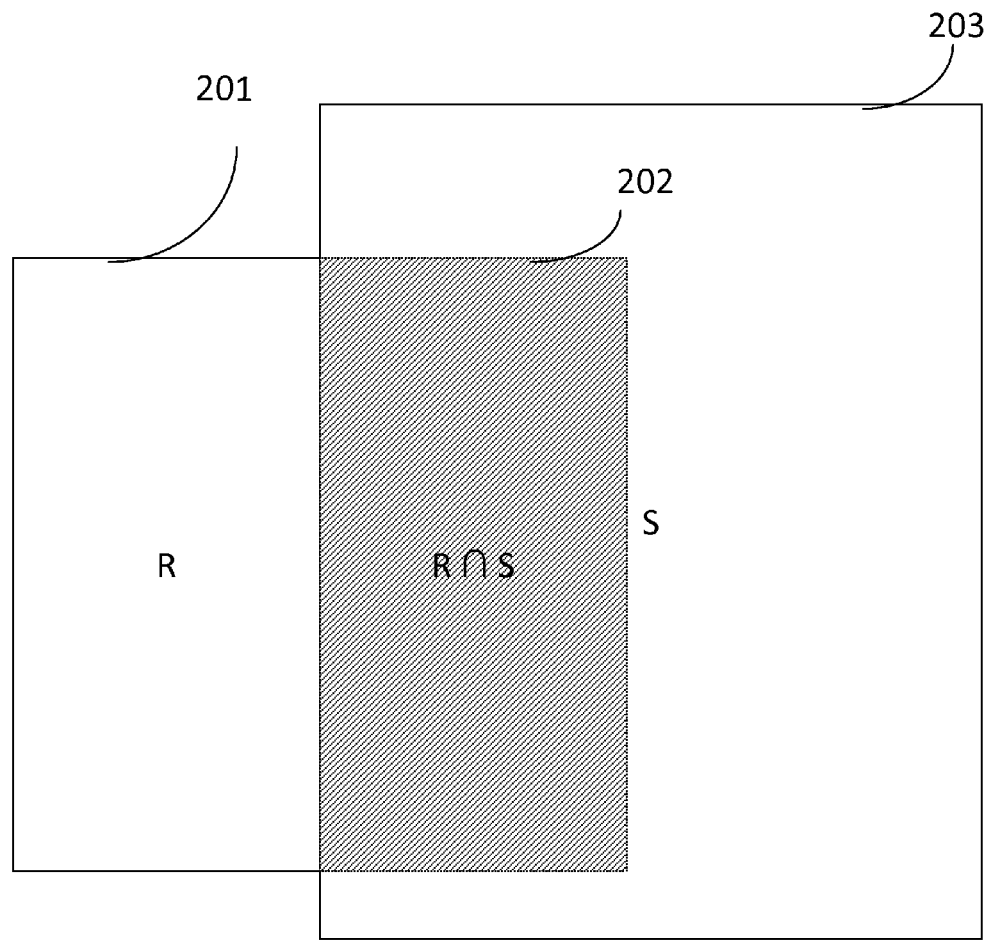
FIG. 2 depicts a geometric distance between two rectangular text blocks, where symbol ∩ denotes intersection of two text blocks.

Layout of documents is defined as triple (T, L, C) where T is a set of disjoint (non-intersecting) text blocks present in the document, L is a set of pre-printed geometric lines in the document both vertical and horizontal, and C is a set of text strings representing the contents of all text blocks T. A text block is typically a rectangle comprising a specific area of a document, such as the address of the originating entity or the address of the recipient or a disclaimer or the title of the document. FIG. 1, depicts a typical business document, where element 101 shows a text block, 102 is a geometric pre-printed line and 103 designates the content of a text block. A text block could also be a union of such rectangles. For the purposes of the present invention text blocks could also be any geometric figures such as ovals containing some text in a document. Depending on the method that is used to extract text blocks from images of documents text blocks could be quite different for the same document image. It is immaterial for the method of this invention how the text blocks are obtained (be it by method of X-Y cuts, Docstrum method, background analysis or other methods known in the art, see e.g. "Document Structure and Layout Analysis" by A. M. Namboodiri and A K. Jain, or "Document Structure Analysis Algorithms": A Literature Survey Song Mao, Azriel Rosenfeld, and Tapas Kanungo, Proc. SPIE Electronic Imaging, 2003) as long as the same consistent method is used throughout the whole process. The present invention aims at classifying documents whose text blocks' locations and contents remain largely invariant from instance to instance of document printing. For example, a bill of lading printed by the same company would normally possess this property. The documents originating from different organizations would normally have totally different layouts. Similarly, the patterns of pre-printed horizontal and vertical geometric lines L that are distinguished by their positions and lengths exhibit a degree of invariance provided that they originate with the same source. This does not mean that the lines would be identical since the documents having variable contents necessitate variability in the line patterns. Even invoices printed by the same software program may have a different number of line items, different number of columns and different number of geometric lines if any. As opposed to many methods known in the art, each layout may be represented by one or many templates, each template being a specific instance of a layout (T, L, C). Two templates $(T_1, L_1, C_1)$ and $(T_2, L_2, C_2)$ may differ in all their constituent elements yet represent the same layout.

It is typical for many document image classification systems to rely on OCR results to identify images. While the content of the documents is an important feature, the speed of OCR remains sufficiently slow and the string matching algorithms also slow down the process if one has to classify an image into one or more of potentially thousands of classes. Thus it is advantageous to create a method that minimizes the use of OCR while achieving high accuracy of classification. The present invention achieves this goal by judiciously using other features before resorting to the OCR and string matching.

Figure 4:
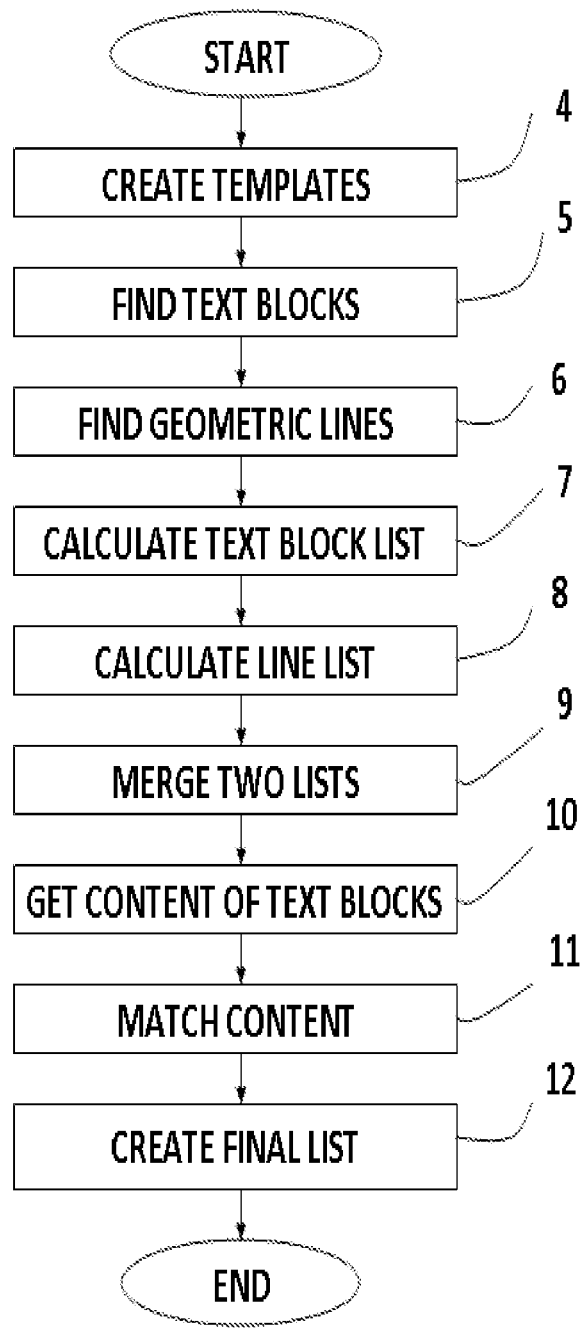
FIG. 4 shows the flowchart of the classification process

The first step in the image classification process is to create templates or prototypes of the documents to be classified (FIG. 4, step 4). This can be done in several ways. If a representative sample of the document images is available, a number of clustering algorithms can be used to cluster the images into sets of similar images by using the distances between images described below (for example, S. Theodoridis, K. Koutrumbas, "Pattern Recognition", Academic Press, 1999). If such sample of images is not available the following process can be used. The first input image is declared a template. If an input image I is classified as similar to the just created template according to the criteria and distances described below, this image I is assigned to the same class as the template. If image I is not classified as similar to the first template this second image is declared to be a second template representing a second class of images and this process is repeated with a number of images available for this purpose until all these images are assigned to classes thus creating a set of template images. Thus we assume from now on that a set of templates has been built and proceed to describe the criteria and distances according to which two document images are considered similar.

Every document (page) image is first processed to extract text blocks (FIG. 4, step 5). This can be done by using any of the known in the art algorithms such as Docstrum method, X-Y cuts, background analysis, etc. referred to above, or by using commercially available software such as Nuance OCR, that provides in its output the text blocks (zones) found in the document images. Text blocks have two components, first being a geometric figure such as rectangle or oval or a union of such figures, and the second is the set of words contained within this geometric figure. The text blocks extracted from a document image form a collection of disjoint figures Ri which we denote $T=(R_1, R_2, R_3, \ldots R_n)$.

Once for two images (say, an input image of an unknown layout and a template image) two sets of text blocks $T_1=(R_1, R_2, \ldots, R_n)$ and $T_2=(S_1, S_2, \ldots, S_m)$ have been obtained, there are many ways to define a distance between any two text blocks $R_i$ and $S_j$. For instance, the geometric distance can be defined as the minimum of distances between all pairs of points (pixels) belonging to $R_i$ and $S_j$ respectively. One can use also Manhattan distance, defined as $|x_1-x_2|+|y_1-y_2|$ for two points with coordinates $(x_1, y_1)$ and $(x_2, y_2)$, and then use the minimum of these distances over all pairs of points from two text blocks. As depicted in FIG. 2, where element 201 shows text block R, 203 shows text block S, 202 shows the intersection of R and S, the preferred embodiment of the present invention makes use of the following (geometric) distance is utilized:

$$\text{GeomDist}(R_i, S_j) = (1 - \text{Intersection Area}(R_i, S_j)/\text{maximum}(\text{Area}(R_i), \text{Area}(S_j)))$$

It is also desirable to take into account the actual difference between the number of characters or words found in blocks $R_i$ and $S_j$ and utilize a weighted sum of the described distances $(0 \le i \le n+1, 0 \le j \le m+1)$:

$$\text{WordDist}(R_i, S_j) = (\text{NWords}(R_i) - \text{NWords}(S_j))/\max((\text{NWords}(R_i), \text{NWords}(S_j)))$$

where NWords(X) designates the number of words in text block X and $$\text{Dist}(R_i, S_j) = w_g \text{GeomDist}(R_i, S_j) + w_w \text{WordDist}(R_i, S_j),$$

where $w_g$, $w_w$ are the weights of the geometric and the word-number distances.

In practice one can set $w_g=0.6$ and $w_w=0.4$.

No matter how a particular distance between text blocks is defined, its definition does not detract from the core of the present invention that is to provide an automatic classification system for document images. Various modifications or other distances between text blocks will be easily conceived by those skilled in the art without departing from the essence and scope of this invention.

Once the distance between the text blocks is defined, a matrix of pair-wise distances $\text{Dist}(R_i, S_j)$ is obtained for all pairs (i,j). There are many ways to calculate a measure of similarity between sets $T_1$ and $T_2$. The preferred embodiment for the present invention utilizes assignment algorithms that calculate the optimal assignment of blocks $R_i$, $S_j$ (matching in the sense of the shortest distance) based on the distance described above. Assignment algorithms are described in R. Burkard, M. Dell'Amico, S. Martello, *Assignment Problems*, SIAM, 2009, and incorporated by reference herein.

The optimal matching of text blocks of two images provides a measure of similarity (that is distance), $DTB(T_1, T_2)$, between sets $T_1$ and $T_2$ calculated as the sum of pair-wise distances $Dist(R_i, S_j)$ of the optimal assignment of blocks (summation is over all the matching pairs of text blocks):

$$DTB(T_1,T_2)=\Sigma Dist(R_i,S_j)$$

Figure 3:
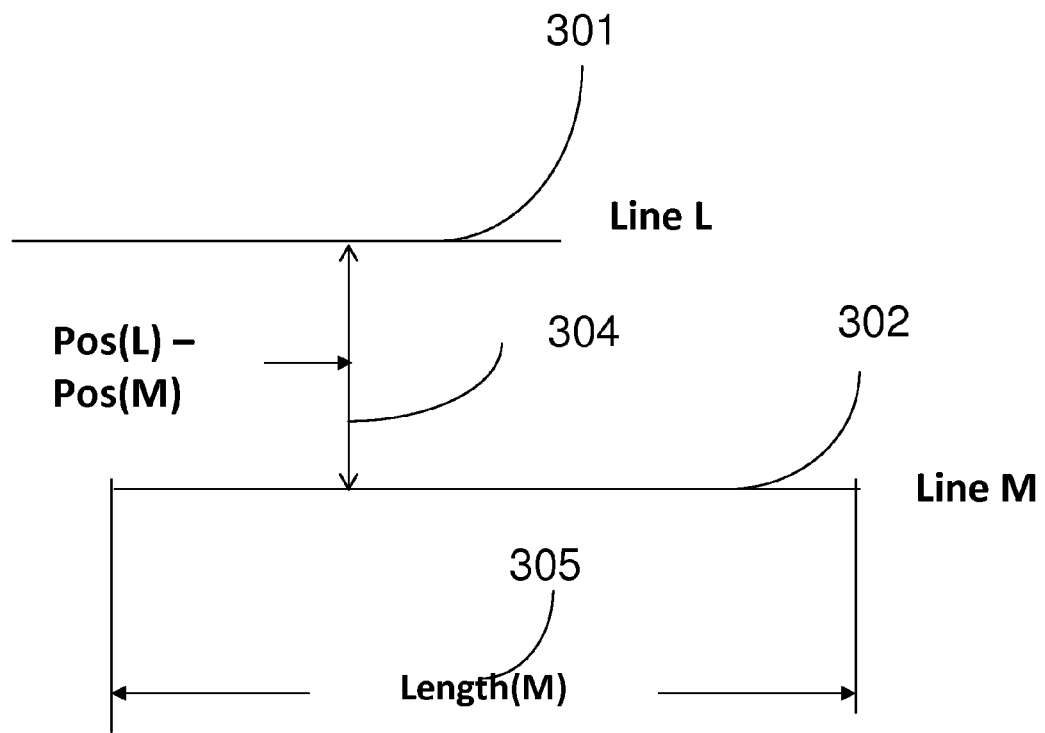
FIG. 3 depicts a line distance between horizontal lines.

The next step according to the present invention is to find a measure of match between two images (such as an input image and a template image) based on the similarity of geometric line patterns (if any) present in two images (FIG. 4, step 6). Unlike magazine or journal papers, many business documents with computer-generated layouts have a number of horizontal and vertical geometric line segments printed on them. U.S. Pat. No. 6,721,463 teaches a complex hierarchical process utilizing line intersections, cross-ratios and dynamic programming to find correspondence between line patterns. One of the drawbacks of the method described in U.S. Pat. No. 6,721,463 is that it does not explicitly take into account the lengths of the line segments involved, these lengths being a very informative feature. According to the present invention, the line segment matching is done separately for the horizontal and for the vertical lines. Since the method is the same for both horizontal and vertical lines, notations that are used below apply to both directions of geometric lines. Each line segment is defined by its position (location) and length. If $P=(L_1, L_2, L_3, \ldots L_n)$ is a set of, say, horizontal line segments in the image I and $Q=(M_1, M_2, M_3, \ldots M_r)$ is a set of horizontal line segments in the image T the following pair-wise distances between any two line segments are calculated according to the present invention ($0<i<n+1$, $0<j<r+1$) as $$LineDist_h(L_i,M_j)=w_p[Pos(L_i)-Pos(Mj)]/N_p+w_1[Length(L_i)-Length(Mj)]/N_1,$$

where Pos (L) designates the position of line segment L (ordinate for horizontal line segments and abscissa for vertical line segments), Length (L) is the length of line segment L, $N_p$, $N_1$ are suitable normalization factors (which could be the maximal width and height of the template image and the input image) and $w_p$, $w_1$ are weights of both features, position and length respectively, $w_p=0.5$, $w_1=0.5$. This distance is illustrated in FIG. 3, where element 301 depicts line L, 302 shows line M, element 304 shows the difference between positions of lines L and M, element 305 shows the length of line M. Having calculated the matrix of pair-wise distances $LineDist_h$ ($L_i$, $M_j$), the optimal matching of line segments $L_i$ and $M_j$ is done via an assignment algorithm exactly in the same way as was described for the text blocks, the only difference being the use of the line distance instead of the text block distance.

Consistent with the preferred embodiment of the present invention, the next step is to compute the distance between two horizontal line patterns $P=(L_1, L_2, L_3, \ldots L_n)$ and $Q=(M_1, M_2, M_3, \ldots M_r)$ from images T and I as the sum of pair-wise distances $$D_h(T,I)=LineDist_h(L_i,M_j),$$

where summation is carried over all pairs of optimally matched line segments $L_i$ and $M_j$.

The distance $D_v$ between vertical line patterns of two images is calculated mutatis mutandis in the exact same manner as for the horizontal ones:

$$LineDist_v(L_i,M_j)=w_p[Pos(L_i)-Pos(Mj)]/N_p+w_1[Length(L_i)-Length(Mj)]/N_1,$$

where in this case $L_i$ and $M_j$ represent the vertical line segments, and the normalization factors are for the vertical line segments.

Again, the optimal matching of vertical line segments is carried out by an assignment algorithm and the distance between two vertical line patterns $P=(L_1, L_2, L_3, \ldots L_n)$ and $Q=(M_1, M_2, M_3, \ldots M_r)$ of two images T and I is defined as the sum of all pair-wise distances $$D_v(T,I)=LineDist_v(L_i,M_j),$$

where summation is carried over all pairs of optimally matched vertical line segments $L_i$ and $M_j$ Finally, the line segment distance between two images T and I is obtained as $$DL(T,I)=w_h D_h(T,I)+w_v D_v(T,I)$$

where weights $w_h$ and $w_v$ should be assigned proportionally to the number of corresponding vertical and horizontal line segments found in two images in the following manner. Denoting the maximum number of horizontal line segments in images I and T as MaxH and the maximum number of vertical line segments in those images as MaxV $$w_h=MaxH/(MaxH+MaxV), w_v=MaxV/(MaxH+MaxV).$$

It will be apparent to those skilled in the art that there are other alternative ways to define the distances between sets of geometric line segments and distances between text blocks (for instance dilating lines into appropriately small rectangles, corresponding to potential distortion of images in the process of scanning, and then calculating distances between thus obtained rectangles as described above for the text blocks). The present invention comprises in its intention and scope all such modifications so that they would represent another embodiment for the present invention.

Once the distances that reflect similarities between text-block patterns and line patterns between images are defined as described above, one can for each image find its line segment and text-block distances to all the templates representing different document layouts. As a result, one can calculate two separate lists of templates ranked according to their line and text-block similarities (FIG. 4, steps 7 and 8) to a given image and then merge the two lists thus forming a list of template candidates for classification of any given image (FIG. 4, step 9). This merger can be accomplished in many different ways, for instance, by introducing two different weights $w_T$ and $w_L$ as text-block and line segment weights and calculating the combined distance between images T and I as $$DTL(T,I)=w_T DTB(T,I)+w_L DL(T,I)$$

A list of candidate templates is created according to how close they are to the image to be classified. Weights $w_T$ and $w_L$ are chosen proportionally to the maximum number of text blocks and line segments found in images T and I:

$$w_T=MaxT/(MaxT+MaxL), w_L=MaxL/(MaxT+MaxL),$$

where MaxT number of text blocks in images T and I, and MaxL is the maximum number of horizontal and vertical line segments combined in images T and I.

No matter how the list of candidate templates is arrived at or the size of this list (be it 20 or 30 or 50 items, which would depend on the application at hand) it falls within the scope of the present invention. Armed with the list of candidate templates according to two features, text blocks and line segments, one can proceed to the next step according to the present invention which executes a comparison of the contents of the matching text blocks. Matching of two layouts $(T_1, L_1, C_1)$ and $(T_2, L_2, C_2)$ thus will be complete when the text blocks contents, $C_1$ and $C_2$ are matched. Since the first step of the present invention provides the optimal assignment (pairing) of text blocks of any two images, the contents of corresponding text blocks can be compared. It is expedient in the process of creating templates described above to store as part of template description the content of each text block found in each template. Referring to FIG. 4, step 10 this is done by subjecting each text block to an OCR (Optical Character Recognition) process which can be accomplished by any of many commercially available OCR packages such as Nuance or Prime Recognition. The OCR process is also applied to the text blocks of every image to be classified. The outcome of such process is a text string consisting of computer coded (such as ASCII) characters found within each text block. It is possible to calculate the contents of template text blocks in an on-line fashion, that is during the process of classification of an input image but the execution speed of OCR systems is sufficiently slow, so the execution time of the act of classification is reduced when the text strings are prestored in the template files. The text string comparison can be accomplished by a standard Damerau-Levenshtein distance algorithm (Levenshtein V. I., "Binary codes capable of correcting deletions, insertions, and reversals". Soviet Physics Doklady 10: pp. 707-710, 1966), that calculates the distance between two text strings. Alternatively, the Fisher-Wagner dynamic programming algorithm as described in R. A. Wagner and M. J. Fisher, The string-to-string correction problem, Journal of the Association for Computing Machinery, 21(1): 168-173, January 1974, can be used for approximate string matching. Both sources are incorporated as references herein.

The resulting content distance (FIG. 4, step 11) between two images I and J is obtained via $$DC(I,J)=CD(C_i,D_j)$$

where CD denotes the content (Damerau-Levenshtein) distance between the contents $C_i$ and $D_j$ of the text blocks assigned to each other by the step 7 of the of the process in FIG. 4 and the summation is over the pairs of optimally assigned text blocks.

By computing just defined content distance between every template image from the candidate list (obtained as the result of step 9 of the flow chart of FIG. 4) and the input image, the candidate list can now be rearranged according to the content distance whereby the top classification candidate is the one with the lowest content distance, the next one is the candidate with the second lowest content distance, etc. (FIG. 4, step 12). Thus the classification process is completed with the final list of candidates with the most similar to the input image candidate template at the top of the list, the next closest to the input image candidate next on the list, and so forth. This process is applicable to any number of layouts (templates) and being totally automatic does not require a manual intervention.

If the set of documents to be classified has a relatively small number of different layouts and the speed of OCR process is sufficiently fast for processing of all desired document in the allotted time the final list of templates can be obtained based on the following combined distance $$D(T,I)=w_{TL}DTL(T,I)+w_C DC(T,I),$$

where weights $w_{TL}$ and $w_C$ indicate the contribution of the non-content and content related features respectively. These weights can be chosen experimentally, based on a training set of images or dynamically, reflecting numbers of line segments and text blocks present in the images T and I.

Therefore, the present invention also comprises a hierarchical two step process that expedites the processing and a more straightforward method that is easier to implement but which requires a longer execution time.

In practice there are sometimes variations in the layouts of documents due to historical changes in programs generating them, noise, and considerable variability of input data that is printed in these documents. It may be desirable therefore to have more than one template representing essentially the same layout. This plurality of templates corresponding to the same document layout is entirely within the scope of the present invention. The policy of accepting a given template at the top of the list of templates generated as a result of classification is as follows. If the top candidate template is found with sufficient confidence (that is within a user predefined distance threshold, with distances to templates as described above), the classification result is deemed to be this top template which is accepted. If the top candidate and several (more or equal than one, depending on the error requirements of the business application) next ranked candidates do not have sufficient confidence (falling below a pre-defined threshold) but they belong to the same layout, and the sum of their confidences exceeds another pre-defined threshold the input image is classified as belonging to the class (layout) of the top template. If neither of these two cases takes place the input image would be rejected by the system.

Variability of the input images is also responsible for the layout invariance observable only in a portion of document images, typically the upper half or third of the image, and the lower one eight of the image. The method of the present invention including the process of template creation extends without changes to any sub-images of document images, and therefore extends the scope of applicability of the present invention.

What is claimed is:

1. A method of automatic commercial document image classification using a computer for performing the steps of:
   automatically obtaining the document layout using the salient features of the document images layout, said features consisting of text blocks, geometric line segments and the contents (sets of words) of said text blocks;
   defining distances between such layouts;
   automatically creating a plurality of classification template layouts directly from said distances;
   Ordering said plurality of classification template layouts and generating a ranked list of candidate template layouts best matching a given input document layout in such a way that the classification template layout most similar to the document layout to be classified is at the top of the list (highest ranked layout), the next likely candidate template layout is in the second position and so forth;
   classifying the input image as belonging to the class of the top template layout in said ranked list of template layouts.

2. The method of claim 1 comprising
   generation of a set of text blocks for each said classification template layout and for any input image layout to be classified, each such text block consisting of two components, said components being the first the geometric figure (area) encompassing the text block, and second the collection of words contained within this figure;
   using said text block components for computing a combined geometric/word distance between two text blocks, this distance having two parts, the geometric part as distance between two geometric figures containing the text blocks, and the word part reflecting the difference in the number of words contained within said geometric figures.

3. The method of claim 2 further
matching the two sets of text blocks generated for two document (page) images and calculating a distance between two sets of text blocks belonging to two document (page) images.

4. The method of claim 2 with further steps of
generating for each text block a set of text strings representing the content of said text block;
using a word distance to calculate a content distance between two text blocks.

5. The method of claim 4 additionally
computing a final distance between each classification template layout and an input image layout, said distance comprising both non-content and content distances;
building a list of template layouts ranked according to their final distances from the input image layout.

6. The method of claim 1 further
using a set of geometric horizontal line segments for each classification template layout and for any input image layout to be classified, each said horizontal line segment being determined by its vertical position (ordinate) and by its length;
calculating a distance between two horizontal line segments belonging to two layouts.

7. The method according to claim 1 further
using a set of geometric vertical line segments for each classification template layout and for any input image layout to be classified, each said vertical line segment being determined by its horizontal position (abscissa) and by its length;
calculating a distance between two vertical line segments belonging to two layouts.

8. The method of claim 1 further
calculating a combined (horizontal-vertical) line segment distance between each classification template layout and an input image layout.

9. The method of claim 8 additionally
matching two sets of horizontal line segments and two sets of vertical line segments belonging to each classification template layout and an input image layout and
calculating a line segment distance between said sets of horizontal and vertical line segments.

10. The method according to claim 1 further
calculating a combined text block-line segment distance between each classification template layout and an input image layout, said distance being a non-content distance.

11. The method according to claim 1 whereby the decision to accept the highest ranked template layout in the ranked list of template layouts as the classification outcome is made under at least two conditions, first, when said highest ranked template layout is found with sufficient confidence (sufficient confidence criterion), and second, when the sum of confidences of several highest ranked template layouts from the list exceeds a pre-defined threshold, and said highest ranked layouts correspond to the same document layout.

12. The method of claim 1 further applied to any sub-images of document images, said sub-images typically representing the upper half or one third of the entire document image and one eight of the lower half of the entire document image.

* * * * *